(12) United States Patent
Burgess (10) Patent No.: US 9,885,388 B2
(45) Date of Patent: Feb. 6, 2018

(54) LINEAR MOTION ASSEMBLY

(71) Applicant: SAINT-GOBAIN PERFORMANCE PLASTICS RENCOL LIMITED, Coventry (GB)

(72) Inventor: James K. Burgess, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 15/272,805

(22) Filed: Sep. 22, 2016

(65) Prior Publication Data
US 2017/0082142 A1   Mar. 23, 2017

Related U.S. Application Data

(60) Provisional application No. 62/222,600, filed on Sep. 23, 2015.

(51) Int. Cl.
*F16C 29/10* (2006.01)
*F16C 33/20* (2006.01)
(Continued)

(52) U.S. Cl.
CPC ............ *F16C 29/10* (2013.01); *B60N 2/4811* (2013.01); *B62K 25/04* (2013.01); *F16C 29/002* (2013.01);
(Continued)

(58) Field of Classification Search
CPC ........ F16C 29/002; F16C 29/02; F16C 29/10; F16C 33/201; F16C 33/205;
(Continued)

(56) References Cited

U.S. PATENT DOCUMENTS 3,413,716 A * 12/1968 Schwertz ............ H01F 17/0033
29/602.1
3,603,623 A    9/1971 Widman
(Continued)

FOREIGN PATENT DOCUMENTS

AU    2013204394 A1    5/2013
FR       2824115 A1   10/2002
(Continued)

OTHER PUBLICATIONS

Intenational Search Report issued for PCT/EP2016/072733, dated Jan. 9, 2017, 2 pages.

*Primary Examiner* — Marcus Charles
(74) *Attorney, Agent, or Firm* — Chi S. Kim; Abel Law Group, LLP (57) ABSTRACT

A linear motion assembly including a component having a longitudinal axis and adapted to translate along the longitudinal axis, and a bearing comprising a spiral body including a substrate and a low friction material, wherein the bearing extends around the component and provides a low friction interface for translation of the component, and wherein the bearing is adapted to prevent longitudinal translation of the component in a locked condition and permit longitudinal translation of the component in an unlocked condition. In an embodiment, the bearing is adapted to transition between the locked and unlocked conditions upon circumferential translation of an axial end of the spiral body, longitudinal translation of an axial end of the spiral body, or a combination thereof.

20 Claims, 4 Drawing Sheets

(51) Int. Cl.
*F16C 29/00* (2006.01)
*F16C 29/02* (2006.01)
*B62K 25/04* (2006.01)
*B60N 2/48* (2006.01)
*B62K 25/08* (2006.01)
*F16B 7/14* (2006.01)

(52) U.S. Cl.
CPC ............ *F16C 29/02* (2013.01); *B60N 2/4823* (2013.01); *B62K 25/08* (2013.01); *F16B 7/1481* (2013.01); *F16C 33/201* (2013.01); *F16C 33/205* (2013.01); *F16C 33/206* (2013.01); *F16C 2208/02* (2013.01); *F16C 2240/12* (2013.01); *F16C 2240/30* (2013.01); *F16C 2240/40* (2013.01); *F16C 2240/60* (2013.01); *F16C 2326/26* (2013.01)

(58) Field of Classification Search
CPC .............. F16C 2208/02; F16C 2240/12; F16C 2240/30; F16C 2240/40; F16C 2240/60; F16C 2324/26; B60N 2/4811; B60N 2/4823; B62K 25/08; F16B 7/1481
USPC ... 384/21, 26, 34, 40, 42, 17, 22, 35, 37–38
See application file for complete search history.

(56) References Cited

U.S. PATENT DOCUMENTS

| | | |
|---|---|---|
| 3,856,253 A | 12/1974 | Seebinger |
| 4,657,425 A | 4/1987 | Takahashi |
| 5,765,449 A | 6/1998 | LeMire |
| 7,108,327 B2 | 9/2006 | Locke et al. |
| 2010/0281861 A1* | 11/2010 | Emigh ............... F16C 11/12 60/525 |
| 2011/0198868 A1 | 8/2011 | Hodges |
| 2012/0115348 A1 | 5/2012 | Reaves et al. |
| 2012/0204617 A1* | 8/2012 | Hambalko ............ B02C 4/283 72/237 |
| 2012/0225408 A1 | 9/2012 | Moore |
| 2015/0084725 A1* | 3/2015 | Aigner ................ F16F 1/10 335/270 |

FOREIGN PATENT DOCUMENTS

| | | | |
|---|---|---|---|
| GB | 509451 A | 7/1939 | |
| JP | 62171457 A * | 7/1987 | ............ H02N 2/02 |
| WO | 2015011555 A1 | 1/2015 | |

* cited by examiner

LINEAR MOTION ASSEMBLY

CROSS-REFERENCE TO RELATED APPLICATION(S)

This application claims priority under 35 U.S.C. §119(e) to U.S. Patent Application No. 62/222,600 entitled "LINEAR MOTION ASSEMBLY," by James K. Burgess, filed Sep. 23, 2015, which is assigned to the current assignee hereof and incorporated herein by reference in its entirety.

FIELD OF THE DISCLOSURE

The present disclosure relates to linear motion assemblies, and more particularly to selectively lockable linear motion assemblies.

RELATED ART

Linear motion assemblies generally include an inner component, such as a rod or shaft, reciprocally mounted within a bore of an outer component, such as a housing. A low friction interface may be provided in an annulus between the inner and outer components to facilitate sliding. Certain low friction interfaces include bearings formed from low friction material. In certain applications it may be desirable to selectively lock the inner and outer components relative to one another in order to prevent longitudinal translation therebetween.

In bicycle suspension, for example, the inner component is locked relative to the outer component by adjusting fluidic characteristics within the annulus between the stanchion and the housing. For example, a valve in the annulus through which fluid can typically flow may be closed to prevent pressure equalization within the annulus. The stanchion is thus incapable of linear travel until the valve is opened. Such systems are expensive and subject to failure over prolonged use. Gaskets and linkages can wear down or fail, causing fluid to escape from the annulus.

In head restraint systems for vehicles, the post connecting the head restraint to a seat back typically includes notches into which a detent can selectively hold the post at a fixed relative position. Alternate designs have previously been considered but they are often not capable of meeting the safety requirements for translation resistance.

Industries, such as the bicycle and vehicle head restraint industries continue to demand improvements in linear motion assemblies, particularly as it relates to selective locking capabilities.

BRIEF DESCRIPTION OF THE DRAWINGS

Embodiments are illustrated by way of example and are not intended to be limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the linear motion arts In accordance with an embodiment, a linear motion assembly can include an inner component adapted to translate along a longitudinal axis. A bearing including a spiral body can extend around the inner component and provide a low friction interface for translation thereof. The bearing can include a substrate and a low friction material. In an unlocked condition, the inner component can longitudinally translate within the bearing. In a locked condition, the inner component is prevented from longitudinally translating with respect to the bearing. In a particular embodiment, the bearing can be selectively transitioned between the locked and unlocked conditions by circumferential translation of an axial end of the spiral body, longitudinal translation of an axial end of the spiral body, or a combination thereof.

Figure 1:
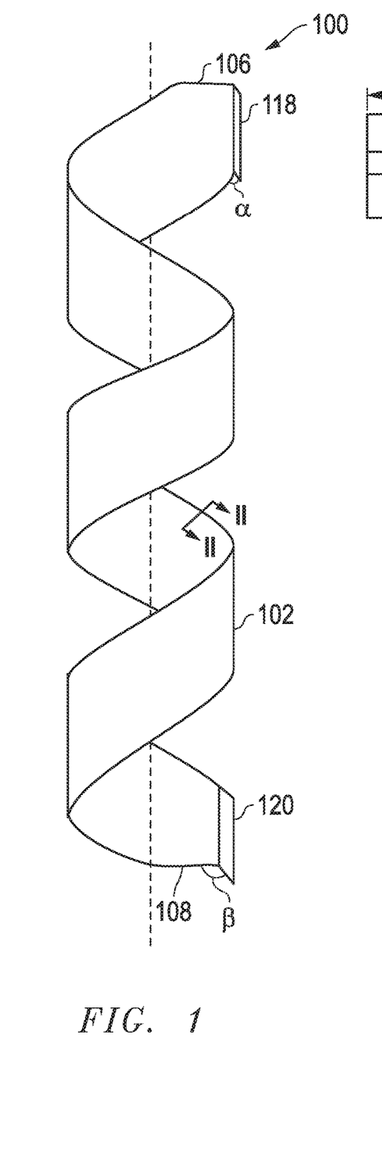
FIG. 1 includes an elevation view of a bearing in accordance with an embodiment.

FIG. 1 includes a side elevation view of a bearing 100 in accordance with an embodiment. The bearing 100 has a spiral body 102 extending around a central axis 104.

In a particular embodiment, the spiral body 102 can define a helix. The helix can have an average helix angle, as measured in the unlocked condition, of at least 5°, at least 10°, at least 15°, at least 20°, at least 25°, at least 30°, at least 35°, at least 40°, at least 45°, at least 50°, at least 55°, at least 60°, at least 65°, at least 70°, or at least 75°. In an embodiment, adjacent coils of the spiral body 102 can at least partially overlap. This configuration may enhance the radial loading capability of the bearing 100. In another embodiment, adjacent coils can be spaced apart which increases surface area contact between the spiral body 102 and an inner component.

In the unbiased state, prior to introduction of a loading condition, the spiral body 104 can have an internal diameter, $ID_{SBU}$, an outer diameter, $OD_{SBU}$, and a length, $L_{SBU}$, as measured between axial ends 106 and 108. In a particular instance, the internal diameter, $ID_{SBU}$, can be less than a diameter, $D_C$, of an inner component (not illustrated) disposed within the spiral body 104. In another instance, the internal diameter, $ID_{SBU}$, as measured in the uninstalled state, can be equal to or even greater than the diameter, $D_C$, of the inner component. For example, $ID_{SBU}$ can be at least 1.0 $D_C$, at least 1.01 $D_C$, at least 1.05 $D_C$, at least 1.1 $D_C$, or at least 1.2 $D_C$.

Figure 2:
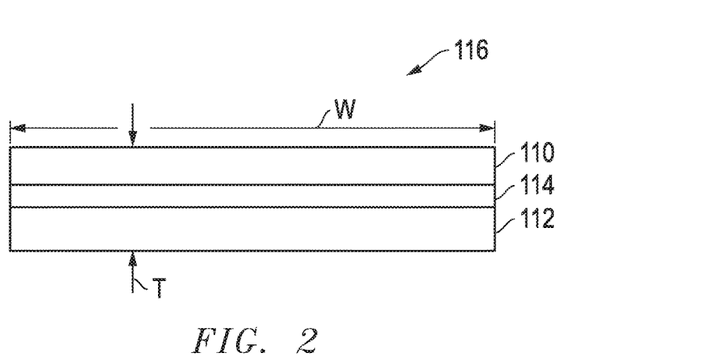
FIG. 2 includes a cross-sectional elevation view of the bearing in accordance with an embodiment, as seen along Line II-II in FIG. 1.

Referring to FIG. 2, in an embodiment, the spiral body 102 can be formed from a sheet of material, such as a length, L, of ribbon 116, curved into a spiral—or more particularly a helical—shape. In an embodiment, the length of the ribbon can be the largest dimension of the ribbon. The ribbon can further define a width, W, and a thickness, T. In a particular embodiment, the thickness, T, is no greater than the width, W. For example, W can be at least 1.0 T, at least 1.5 T, at least 2 T, at least 3 T, at least 4 T, at least 5 T, at least 10 T, or at least 25 T. In another embodiment, T can be no less than 0.001 W, no less than 0.01 W, or no less than 0.1 W. In another embodiment, the width, W, is no greater than the length, L. For example, L can be at least 1.0 W, at least 1.5 W, at least 2 W, at least 5 W, at least 10 W, at least 25 W, or at least 100 W. In another embodiment, L can be no greater than 1000 W, or no greater than 500 W.

In an embodiment, the ribbon 116 can include a low friction material 110 coupled to a substrate 112. The low friction material 110 can be laminated to the substrate 112. In an embodiment, the low friction material 110 can be in direct contact with the substrate 112. As used with referenced to the spiral body 102, "direct contact" refers to a stack of materials that directly contact one another without any intervening layers other than adhesive. In another embodiment, the low friction material 110 and substrate 112 can be spaced apart from one another by at least one intermediate layer 114, such as a primer.

In an embodiment, the intermediate layer includes a primer layer which can include an oligomeric condensate of silanol. In embodiments, the intermediate layer 114 has a thickness of at least 0.2 microns, as at least 0.5 micron, at least 0.8 microns, at least 1 micron, at least 1.5 microns, at least 2 microns, at least 2.5 microns, or at least 3 microns.

In yet other embodiments, the thickness is not greater than 5 microns, such as not greater than 4.5 microns, not greater than about 4 microns, not greater than 3.5 microns, not greater than 3 microns, not greater than 2.5 microns, or not greater than about 2 microns.

In an embodiment, the adhesive layer between the low friction material 110 and the substrate 112 can include a thermoplastic polymer or a blend of thermoplastic polymers. The thermoplastic polymers can include, for example, perfluoroalkoxyethylene (PFA), tetrafluoroethylene-perfluoro (methyl vinyl ether) copolymer (MFA), ethylene tetrafluoroethylene (ETFE), tetrafluoroethylene-hexafluoropropylene (FEP), modified tetrafluoroethylene-hexafluoropropylene (mFEP), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), polyetherketone (PEK) or any combination thereof.

The low friction material 110 applied to the substrate 112 can be a low friction tape. In an embodiment, the low friction material 110 can include one or more fluoropolymers. Exemplary fluoropolymers include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof. A PTFE compound tape is used in accordance with particular embodiments. The PTFE compound tape can be surface-pretreated or etched to a desirable surface characteristic.

The low friction material 110 can include one or more fillers to improve mechanical properties, e.g., fibers, inorganic materials, thermoplastic materials, mineral materials, or mixtures thereof. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO$_2$), liquid crystal polymers (LCP), aromatic polyesters, molybdenum disulfide, tungsten disulfide, graphite, grapheme, expanded graphite, boron nitrade, talc, calcium fluoride, alumina, silica, titanium dioxide, calcium fluoride, boron nitride, mica, Wollastonite, silicon carbide, silicon nitride, zirconia, carbon black, pigments, or any combination thereof. The filler can be in a range of 0.1 wt % and 75 wt % of the low friction material, such as in a range of 1 wt % and 50 wt %, in a range of 5 wt % and 40 wt %, or in a range of 25 wt % and 35 wt %.

In a particular instance, the filler can simultaneously permit sliding of the inner component in the unlocked state and prevent sliding of the inner component in the locked state. For example, in a particular instance, filler comprising carbon fibers is embedded within the low friction material 110. With minimal radial pressure between the low friction material 110 and the inner component, the carbon fibers provide minimal resistance to sliding. However, the carbon fibers can grip the inner component upon introduction of a radially compressive force.

In a particular embodiment, the low friction material 110 can have a non-linear frictional profile, such as a dual frictional profile, where the force to overcome friction greatly increases when compressive force between the low friction material 110 and the inner component increases.

In an embodiment, the low friction material 110 can have a thickness of at least 0.01 mm, at least 0.05 mm, at least 0.1 mm, or at least 0.2 mm. In other embodiments, the low friction material 110 has a thickness of not greater than 2.0 mm, not greater than 1.5 mm, not greater than 1.0 mm, not greater than 0.8 mm, not greater than 0.5 mm, not greater than 0.4 mm, or not greater than 0.35 mm. In other embodiments, the low friction material 110 can have a thickness in a range from 0.2 mm to 0.4 mm, from 0.2 mm to 0.25 mm, or from 0.28 mm to 0.32 mm.

The substrate 112 can include a resilient material. Exemplary materials include metals, alloys, ceramics, and polymers. In a particular embodiment, the substrate 112 consists of, or consists essentially of, a metal, such as spring steel.

In particular embodiments, the substrate 112 may include a corrosion resistant coating. The corrosion resistant coating can have a thickness of in a range of 1 micron and 50 microns, such as in a range of 5 microns and 20 microns, or even in a range of 7 microns and 15 microns. The corrosion resistant coating can include an adhesion promoter layer and an epoxy layer. The adhesion promoter layer can include a phosphate of zinc, iron, manganese, tin, or any combination thereof. Additionally, the adhesion promoter layer can be nano-ceramic layer. The adhesion promoter layer can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof.

The substrate 112 can have a thickness of at least 0.01 mm, at least 0.1 mm, or at least 0.2 mm. In other embodiments, the substrate 112 has a thickness of not greater than 20 mm, not greater than 15 mm, not greater than 10 mm, not greater than 5 mm, not greater than 1 mm, not greater than 0.5 mm, or not greater than 0.1 mm. In other embodiments, the substrate can have a thickness in a range from 0.1 mm to 20 mm, or from 1 mm to 5 mm.

Tabs 118 and 120 can extend from the spiral body 102 at axial ends 106 and 108. In an embodiment, at least one of the tabs 118 or 120 can be integral to the spiral body 102. In a more particular embodiment, at least one of the tabs 118 or 120 can be monolithic with the spiral body 102. In another embodiment, both tabs 118 and 120 can be integral to the spiral body 102, such as monolithic therewith. In a particular instance, at least one of the tabs 118 or 120 can be angularly offset from the spiral body 102. That is, at least one of the tabs 118 or 120 can be offset from the central axis 104 by a different angle with respect to the remaining spiral body 102. For example, tab 118 can be angularly offset from adjacent portions of the spiral body by an angle, α, of at least 1°, at least 5°, at least 10°, at least 25°, at least 45°, or at least 90°. Similarly, tab 120 can be angularly offset from adjacent portions of the spiral body by an angle, β, of at least 1°, at least 5°, at least 10°, at least 25°, at least 45°, or at least 90°. The tabs 118 and 120 can include recesses, openings, projections, clips, ties, clamps, any other suitable connection element, or a combination thereof to permit engagement therewith for selective locking and unlocking.

The tabs 118 and 120 may permit engagement with the axial ends 106 and 108, thereby permitting selective locking and unlocking of the bearing 100 relative to the inner component. In an embodiment, the tabs 118 and 120 can extend across the entire width, W, of the ribbon 116. In another embodiment, the tabs 118 or 120 can have a width less than the width of the ribbon 116.

Figure 3:
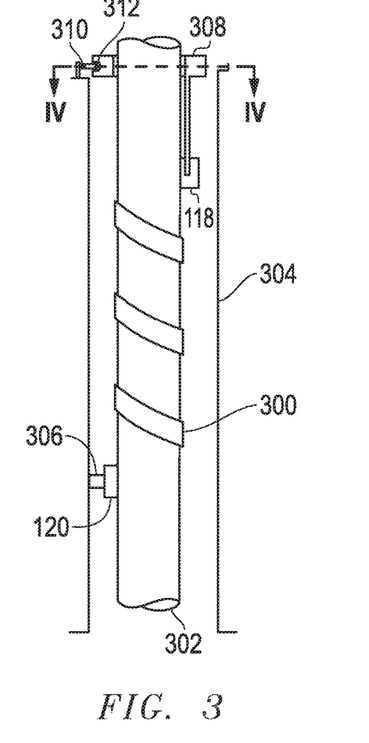
FIG. 3 includes a partial cross-sectional elevation view of a linear motion assembly in accordance with an embodiment.

Referring to FIG. 3, a linear motion assembly 300 can generally include the bearing 100 as described above disposed between an inner component 302 and an outer component 304. When unlocked, the inner component 302 can longitudinally translate with respect to the outer component 304 in at least one longitudinal direction. In a particular embodiment, when unlocked, the inner component 302 can longitudinally translate with respect to the outer component 304 in both longitudinal directions. In the locked condition, the inner component 302 is relatively fixed with respect to the outer component 304 in at least one longitudinal direction. A force applied to the inner component 302 in a first longitudinal direction may not cause the inner component 302 to translate relative to the outer component 304. A force applied to the inner component having the same magnitude in a second longitudinal direction, opposite the first longitudinal direction, may cause the inner component 302 to move relative to the outer component 304. That is, in a particular embodiment, the inner component 302 may be locked with respect to the outer component 304 in only a single longitudinal direction. For example, as illustrated in FIG. 3, the assembly 300 may be locked such that the inner component 302 does not move relative to the outer component 304 when a force is applied to the inner component 302 in a downward direction. Force having a same magnitude applied in an upward direction, however, may cause the inner component 302 to translate upward as the upward force may cause the bearing 100 to loosen. Skilled artisans will recognize after reading the disclosure that the direction of one-way locking may be reversed by inverting the orientation of the assembly 300 or changing the characteristics of the moveable component (described below).

In a particular embodiment, when locked, translation of the inner component 302 can occur in a first direction upon application of at least 300 N, at least 350 N, at least 400 N, at least 450 N, at least 500 N, at least 550 N, or even at least 600 N. Translation of the inner component 302 may not occur below 300 N, below 350 N, below 400 N, below 450 N, below 500 N, below 550 N, or below 600 N. Meanwhile, translation of the inner component 302 in a second direction, opposite the first direction, may occur upon application of no greater than 200 N, no greater than 175 N, no greater than 150 N, no greater than 125 N, no greater than 100 N, no greater than 75 N, no greater than 50 N, or no greater than 25 N. That is, when locked the inner component 302 can translate in the second direction upon application of a force while translation in the first direction is prohibited upon application of the same force.

In the unlocked condition, the inner component 302 may translate in either direction upon application of a generally same force.

In certain embodiments, the material spring force of the bearing 100 (e.g., as provided by the substrate 112) may be insufficient by itself to lock the inner component. That is, left in the unloaded state such that no external force is tensioning the bearing open or closed (i.e., when the bearing 100 is not locked), the bearing 100 cannot provide sufficient force to prevent translation of the inner component 302. Instead, the bearing 100 is locked by tensioning at least one of the axial ends 106 or 108 to compress the diameter thereof.

In an embodiment, the tab 120 of the bearing 100 may be coupled to the outer component 304 by an engagement member 306. The engagement member 306 may include, for example, a rod extending from the outer component 304, a tie, a cable, another suitable connection element, or any combination thereof. In an embodiment, the tab 120 can be attached to the outer component 304 by one or more welds, a threaded or non-threaded fastener, adhesive, by any other suitable connection method, or a combination thereof. In certain embodiments, the tab 120 can be secured such that there is little, or no, relative movement between the tab 120 and the outer component 304.

A moveable component 308 can connect to the opposing tab 118 formed at the axial end 106 of the spiral body 102. The moveable component 308 can selectively move the tab 118 so as to loosen and tighten the bearing 100 relative to the inner component 304. In an embodiment, the moveable component 308 can include a rotatable component. Rotation (i.e., circumferential translation) of the moveable component 308 can loosen and tighten the bearing 100 to unlock and lock the bearing, respectively. As viewed from a top view (looking from the top of the page down), clockwise rotation of the moveable component 308 of FIG. 3 locks the bearing 100 (i.e., tightens the bearing). To the contrary, the bearing 100 is unlocked when the moveable component 308 is rotated counter-clockwise, as viewed from the top view. This configuration is merely illustrative and can be reversed such that the bearing is locked via counter-clockwise rotation and unlocked via clockwise rotation.

In accordance with an embodiment, the bearing 100 can maintain its locked or unlocked condition until further action is taken to the moveable component 308. That is, the bearing 100 can remain locked or unlocked until a user adjusts the moveable component 308. A feature 310, for example, may engage with the moveable component 308 to prevent relative rotational movement of the moveable component 308. The feature 310 can include a detent, a frictional interface, a threaded or non-threaded fastener, a bayonet type engagement, a castellated or ribbed surface, or another suitable stop feature which can maintain the bearing 100 at a fixed relative rotational position. In an embodiment, the feature 310 can engage the moveable component 308 at a certain rotational position. For example, the moveable component 308 can include a recess 312. The feature 310 can extend into the recess 312 and lock the moveable component 308 at a prescribed rotational position. Introduction of a sufficient rotational force can disengage the feature 310 from the recess 312, permitting a user to unlock the bearing 100 and permit longitudinal translation of the inner component 302 relative thereto.

In a particular embodiment, the bearing 100 can be locked and unlocked with the application of relatively similar loads. For example, locking the bearing may require a force, $F_L$, and unlocking the bearing may require a force, $F_U$, wherein $F_L$ is in a range between 0.25 $F_U$ and 4.0 $F_U$. In a more particular embodiment, $F_L$ is in a range between 0.3 $F_U$ and 3.0 $F_U$, in a range between 0.35 $F_U$ and 2.5 $F_U$, in a range between 0.4 $F_U$ and 1.9 $F_U$, in a range between 0.5 $F_U$ and 1.8 $F_U$, in a range between 0.55 $F_U$ and 1.7 $F_U$, in a range between 0.6 $F_U$ and 1.6 $F_U$, in a range between 0.65 $F_U$ and 1.5 $F_U$, in a range between 0.7 $F_U$ and 1.4 $F_U$, in a range between 0.75 $F_U$ and 1.3 $F_U$, in a range between 0.8 $F_U$ and 1.25 $F_U$, or in a range between 0.9 $F_U$ and 1.1 F. In an embodiment, a force required to unlock the bearing 100 can be less than 100 N, less than 90 N, less than 80 N, less than 70 N, less than 60 N, less than 50 N, or less than 40 N. In a further embodiment, the force required to unlock the bearing can be at last 1 N, at least 5 N, at least 10 N, or at least 15 N.

Figure 4:
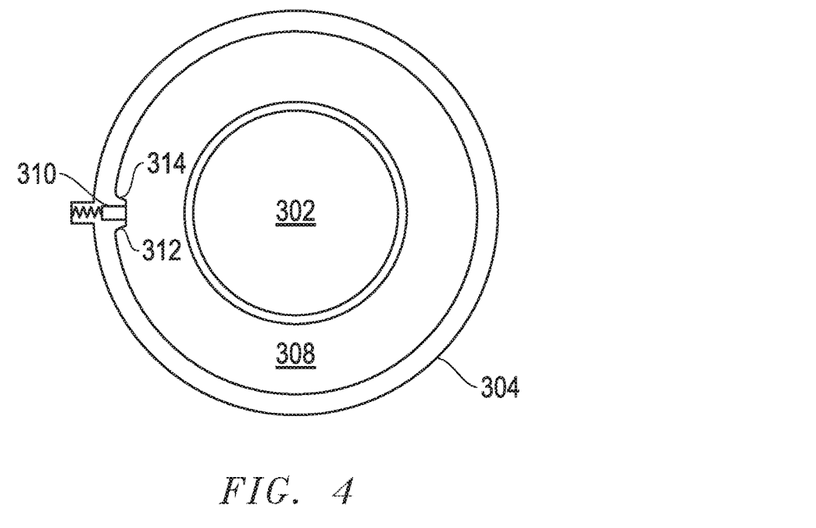
FIG. 4 includes a cross-sectional top view of the linear motion assembly in accordance with an embodiment, as seen along Line IV-IV in FIG. 3.

FIG. 4 illustrates a top view of the assembly 300 of FIG. 3 in the locked condition as seen along Line B-B in FIG. 3. As illustrated, the feature 310 can be spring loaded or otherwise biased to maintain the feature 310 within the recess 312. The recess 312 can include a weakened portion 314 (such as a ramped portion) to more easily permit disengagement between the feature 310 and the recess 312. Application of a rotational force to overcome the weakened portion 314 can disengage the bearing 100 to the unlocked condition.

Figure 5:
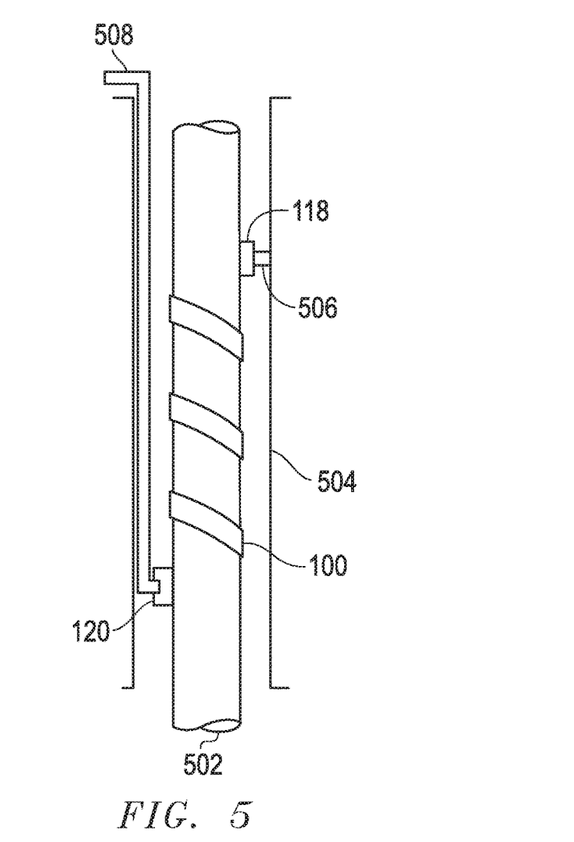
FIG. 5 includes a partial cross-sectional elevation view of a linear motion assembly in accordance with another embodiment.

FIG. 5 includes another embodiment of a linear motion assembly 500 including an inner component 502, an outer component 504, a bearing 100 disposed therebetween, and a moveable component 508 coupled to the tab 120 of the bearing 100. Unlike the assembly 300 of FIGS. 3 and 4, the assembly of FIG. 5 is transitioned between the locked and unlocked conditions by longitudinally translating the tab 120 of the bearing 100 up or down. As the effective length of the bearing 100, as measured by an overall height of the bearing between axial ends 106 and 108, increases, the inner diameter decreases. For example, the bearing 100 can have an unlocked internal diameter, $D_U$, and a locked internal diameter, $D_L$, where $D_L$ is no greater than 0.995 $D_U$, no greater than 0.99 $D_U$, no greater than 0.95 $D_U$, no greater than 0.9 $D_U$, or no greater than 0.8 $D_U$.

In certain embodiments, at least a portion of the bearing 100 can contact the inner component 502 in both the locked and unlocked conditions. In such a manner, the bearing 100 can provide a low friction interface to the inner component 502 when unlocked and prevent longitudinal translation of the inner component 502 in the locked condition.

Bearings 100 in accordance with embodiments described herein can be used in various linear motion assemblies. For example, referring to FIG. 6, the bearing 100 can be used in head restraint assemblies 600 where a head restraint post 602 extends from a head restraint cushion 604 and operatively secures to a seat back 608. The bearing 100 can permit height adjustment of the head restraint cushion 604 while allowing a user to lock the head restraint cushion 604 at a desired height relative to the seat back 608. A second head restraint post 606 can extend from the head restraint cushion 604 and operatively secure to the seat back 608. The second head restraint post 606 can include the bearing 100 or another similar engagement structure.

Figure 6:
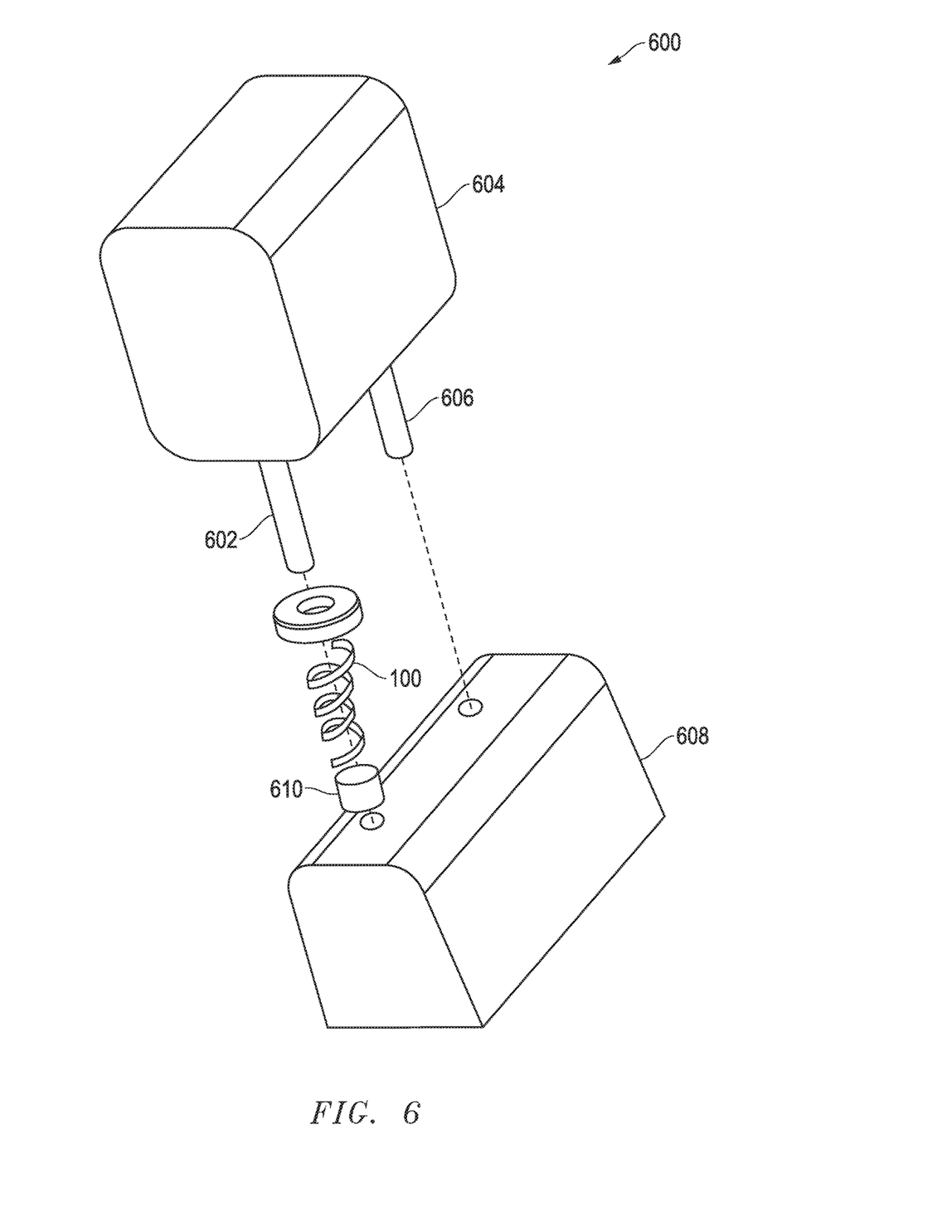
FIG. 6 includes a partially exploded perspective view of a head restraint assembly including a bearing in accordance with an embodiment.

In certain embodiments, the head restraint assembly 600 can further include a slider 610 adapted to be disposed around the head restraint post 602 and provide a low friction sliding interface for longitudinal translation of the head restraint post 602. The slider 610 can include any of the low friction material described herein. In a particular embodiment, the slider 610 can be spaced apart from the bearing 100 by a distance along a longitudinal axis of the head restraint post 602. The distance between the slider 610 and the bearing 100 may be at least 1 cm, at least 5 cm, at least 10 cm, or at least 25 cm. In an embodiment, the distance between the slider 610 and the bearing 100 can be no greater than 100 cm, no greater than 75 cm, or no greater than 50 cm. Spacing the slider apart from the bearing may increase lateral stability of the head retrain post 602. In a particular embodiment, the spacer 610 may include one or more fingers, tines, projections, waves, dimples, ridges, or other similar features which promote a suitable characteristic.

Unlike traditional head restraint assemblies, use of the bearings 100 described herein can permit the use of a notchless head restraint post. Traditional head restraints are limited in their adjustability by the number of notches into which a plunger can secure the post. The present assembly can provide infinite positional adjustment while providing sufficient locking capability to prevent accidental or unwanted translation of the head restraint, such as for example, during an automobile accident.

Figure 7:
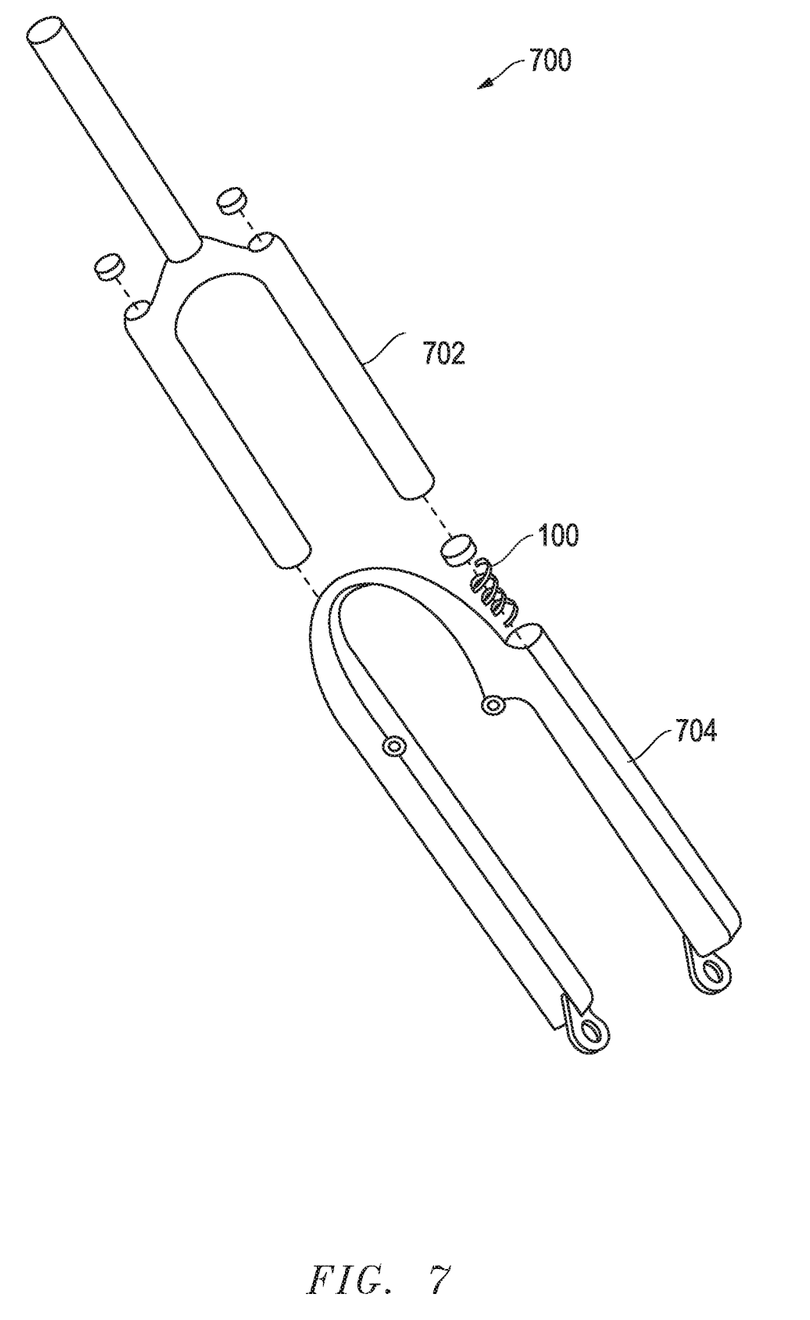
FIG. 7 includes a partially exploded perspective view of a bicycle suspension assembly including a bearing in accordance with an embodiment.

Bearings 100 described herein can also be used, for example, in bicycle suspension assemblies and sub assemblies. Bicycle suspension assemblies typically include a stanchion disposed within a housing. The stanchion can translate with respect to the housing such that the suspension can absorb impact occurring with uneven terrain. Referring to FIG. 7, a bicycle suspension assembly 700 can include a bearing 100 described herein inserted between a stanchion 702 and a housing 704 to provide a low friction interface therebetween. The bearing 100 can also permit "lock out" of the stanchion 702. Locking the suspension occurs when the stanchion 702 is not permitted to travel relative to the housing 704. This may be desirable, for example, when an off-road bicycle is ridden on smooth surfaces, such as a paved road. Unlocked, freely floating suspensions suffer one significant drawback on smooth surfaces—they absorb peddling energy the bicyclist is trying to impart to power the crankset. Rather than transmit 100% of the energy provided by the bicyclist to the peddles, the suspension can absorb some of the energy, thus reducing the bicyclists performance. To combat this inefficiency, the bearing 100 can be locked to prevent suspension absorption and improve power performance. Traditional bicycle suspensions require many additional components to accomplish lock out. Some systems utilize notched stanchions similar to the headrest post described above. A plunger or post can be inserted into the notch to prevent translation of the stanchion. Other systems utilize fluid chambers separated by valves. When the valves are open, fluid (typically oil) can move between the chambers, thus permitting the suspension to absorb impact. When the valves are closed, fluid cannot move between the chambers and the suspension becomes rigid. Both systems have significant drawbacks. The notched system has limited lock-out capability and may require a rider to dismount the bicycle prior to locking; and the fluid chamber system is subject to increase chance of failure as high pressure fluid can rapidly degrade seals and gaskets, causing fluid leakage. Additionally, these fluid systems can be prohibitively expensive.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A linear motion assembly comprising:
a component having a longitudinal axis and adapted to translate along the longitudinal axis; and
a bearing comprising a spiral body including a substrate and a low friction material, wherein the bearing extends around the component and provides a low friction interface for translation of the component, and wherein the bearing is adapted to prevent longitudinal translation of the component in at least one longitudinal direction in a locked condition and permit longitudinal translation of the component in an unlocked condition.

Embodiment 2

A linear motion assembly comprising:
a component having a longitudinal axis and adapted to translate along the longitudinal axis; and
a bearing comprising a spiral body including a substrate and a low friction material, wherein the bearing is selectively lockable, and wherein in a locked condition the component is prevented from longitudinal translation in at least one longitudinal direction.

Embodiment 3

A bearing or a linear motion assembly, the bearing comprising:
a spiral body comprising:
  a substrate; and
  a low friction material coupled to the substrate,
wherein the bearing is adapted to extend around a component and is selectively lockable, and
wherein in a locked condition the component is prevented from longitudinal translation in at least one longitudinal direction.

Embodiment 4

The linear motion assembly or bearing of any one of the preceding embodiments, wherein the bearing is adapted to transition between the locked and unlocked conditions upon: circumferential translation of an axial end of the spiral body; longitudinal translation of an axial end of the spiral body; or a combination thereof.

Embodiment 5

The linear motion assembly or bearing of any one of the preceding embodiments, wherein the bearing further comprises: a feature adapted to maintain the bearing in the locked or unlocked condition.

Embodiment 6

The linear motion assembly or bearing of embodiment 5, wherein the feature comprises a detent.

Embodiment 7

The linear motion assembly or bearing of any one of the preceding embodiments, wherein the linear motion assembly further comprises:
an outer component; and
a moveable component coupled to the outer component, wherein a first axial end of the bearing is coupled to the frame and a second axial end of the bearing is coupled to the moveable component, and wherein the bearing is selectively lockable upon relative movement between the moveable component and the outer component.

Embodiment 8

The linear motion assembly or bearing of any one of the preceding embodiments, wherein locking the bearing requires a force, $F_L$, wherein unlocking the bearing requires a force, $F_U$, and wherein $F_L$ is within a range between 0.25 $F_U$ and 4.0 $F_U$, or wherein $F_L$ is within a range between 0.5 $F_U$ and 2.0 $F_U$, or wherein $F_L$ is within a range between 0.75 $F_U$ and 1.5 F.

Embodiment 9

The linear motion assembly or bearing of any one of the preceding embodiments, wherein at least a portion of the bearing maintains contact with the component in the locked and unlocked conditions.

Embodiment 10

The linear motion assembly or bearing of any one of the preceding embodiments, wherein the spiral body comprises a helix.

Embodiment 11

The linear motion assembly or bearing of any one of the preceding embodiments, wherein the spiral body has an average helix angle, as measured in the unlocked condition, of at least 5°, at least 10°, at least 15°, at least 20°, at least 25°, at least 30°, at least 35°, at least 40°, at least 45°, at least 50°, at least 55°, at least 60°, at least 65°, at least 70°, or at least 75°.

Embodiment 12

The linear motion assembly or bearing of any one of the preceding embodiments, wherein the spiral body comprises a helical ribbon, wherein the helical ribbon has a width, W, a thickness, T, and a length, L, and wherein the thickness is no greater than the width and the width is no greater than the length.

Embodiment 13

The linear motion assembly or bearing of embodiment 11, wherein W is at least 1.5 T, at least 2.0 T, at least 3.0 T, at least 4.0 T, at least 5.0 T, at least 10.0 T, or at least 25.0 T.

Embodiment 14

The linear motion assembly or bearing of any one of the preceding embodiments, wherein the bearing has an unlocked diameter, $D_U$, and a locked diameter, $D_L$, and wherein $D_L$ is no greater than 0.995 $D_U$, no greater than 0.99 $D_U$, no greater than 0.95 $D_U$, no greater than 0.9 $D_U$, or no greater than 0.8 $D_U$.

Embodiment 15

The linear motion assembly or bearing of any one of the preceding embodiments, wherein the substrate comprises a metal, wherein the substrate comprises spring steel.

Embodiment 16

The linear motion assembly or bearing of any one of the preceding embodiments, wherein a material spring force of the substrate as measured on the component is insufficient to prevent longitudinal translation of the component.

Embodiment 17

The linear motion assembly or bearing of any one of the preceding embodiments, wherein the low friction material comprises a filler selected from: glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone ($PPSO_2$), liquid crystal polymers (LCP), aromatic polyesters, molybdenum disulfide, tungsten disulfide, graphite, grapheme, expanded graphite, boron nitrade, talc, calcium fluoride, alumina, silica, titanium dioxide, calcium fluoride, boron nitride, mica, Wollastonite, silicon carbide, silicon nitride, zirconia, carbon black, pigments, or any combination thereof.

Embodiment 18

The linear motion assembly or bearing of any one of the preceding embodiments, wherein in the locked condition the bearing prevents longitudinal translation of the component in at least one longitudinal direction when a force is applied to the component parallel to the longitudinal axis, and wherein the force is at least 450N, at least 455N, at least 460N, at least 465N, at least 470N, or at least 475N.

Embodiment 19

The linear motion assembly or bearing of any one of the preceding embodiments, wherein in the unlocked condition the bearing permits longitudinal translation of the component when a force is applied to the component parallel to the longitudinal axis, and wherein the force is no greater than 70N, less than 60N, less than 50N, less than 40N, less than 30N, or less than 20N.

Embodiment 20

The linear motion assembly or bearing of any one of the preceding embodiments, wherein a force required to unlock the bearing is no greater than 40N, no greater than 35N, no greater than 30N, no greater than 25N, or no greater than 20N.

Embodiment 21

The linear motion assembly or bearing of any one of the preceding embodiments, wherein the component comprises a head restraint post, wherein the head restraint post is coupled to a head restraint cushion, and wherein longitudinal translation of the head restraint post adjusts a relative height of the head restraint cushion with respect to a seat back.

Embodiment 22

The linear motion assembly or bearing of any one of embodiments 1-20, wherein the component comprises a stanchion, wherein the stanchion is disposed at least partially within a housing, wherein the bearing is disposed between the stanchion and the housing, and wherein the bearing is adapted to selectively prevent translation of the stanchion relative to the housing.

Embodiment 23

The linear motion assembly of embodiment 22, wherein the linear motion system comprises a bicycle suspension assembly or subassembly.

Embodiment 24

The linear motion assembly or bearing of any one of the preceding embodiments, further comprising a slider disposed around the component and adapted to provide a low friction sliding interface for longitudinal translation of the component, wherein the slider is spaced apart from the bearing by a distance along the longitudinal axis.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A linear motion assembly comprising:
   a component having a longitudinal axis and adapted to translate along the longitudinal axis; and
   a bearing comprising a spiral body including a substrate and a low friction material, wherein the bearing extends around the component and provides a low friction interface for translation of the component, and wherein the bearing is adapted to prevent longitudinal translation of the component in at least one longitudinal direction in a locked condition and permit longitudinal translation of the component in an unlocked condition.

2. The linear motion assembly of claim 1, wherein the bearing is adapted to transition between the locked and unlocked conditions upon:
   circumferential translation of an axial end of the spiral body;
   longitudinal translation of an axial end of the spiral body; or
   a combination thereof.

3. The linear motion assembly of claim 1, wherein the bearing further comprises:
   a feature adapted to maintain the bearing in the locked or unlocked condition.

4. The linear motion assembly claim 3, wherein the feature comprises a detent.

5. The linear motion assembly of claim 1, wherein the bearing is adapted to transition between the locked and unlocked conditions upon:
   circumferential translation of an axial end of the spiral body;
   longitudinal translation of an axial end of the spiral body; or
   a combination thereof.

6. The linear motion assembly of claim 1, wherein at least a portion of the bearing maintains contact with the component in the locked and unlocked conditions.

7. The linear motion assembly of claim 1, wherein the spiral body comprises a helix.

8. The linear motion assembly of claim 1, wherein the spiral body has an average helix angle, as measured in the unlocked condition, of at least 5°.

9. The linear motion assembly of claim 1, wherein the spiral body comprises a helical ribbon, wherein the helical ribbon has a width, W, a thickness, T, and a length, L, and wherein the thickness is no greater than the width and the width is no greater than the length.

10. The linear motion assembly of claim 9, wherein W is at least 1.5 T.

11. The linear motion assembly of claim 1, wherein the linear motion assembly further comprises:
    an outer component; and
    a moveable component coupled to the outer component, wherein a first axial end of the bearing is coupled to the frame and a second axial end of the bearing is coupled to the moveable component, and wherein the bearing is selectively lockable upon relative movement between the moveable component and the outer component.

12. A bearing for a linear motion assembly, the bearing comprising:
    a spiral body comprising:
      a substrate; and
      a low friction material coupled to the substrate,
      wherein the bearing is adapted to extend around a component and is selectively lockable, and wherein in a locked condition the component is prevented from longitudinal translation in at least one longitudinal direction.

13. The bearing of claim 12, wherein locking the bearing requires a force, $F_L$, wherein unlocking the bearing requires a force, $F_U$, and wherein $F_L$ is within a range between 0.25 $F_U$ and 4.0 $F_U$.

14. The bearing of claim 12, wherein the bearing has an unlocked diameter, $D_U$, and a locked diameter, $D_L$, and wherein $D_L$ is no greater than 0.995 D.

15. The bearing of claim 12, wherein the substrate comprises a metal.

16. The bearing of claim 12, wherein the low friction material comprises a filler selected from: glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO$_2$), liquid crystal polymers (LCP), aromatic polyesters, molybdenum disulfide, tungsten disulfide, graphite, grapheme, expanded graphite, boron nitrade, talc, calcium fluoride, alumina, silica, titanium dioxide, calcium fluoride, boron nitride, mica, Wollastonite, silicon carbide, silicon nitride, zirconia, carbon black, pigments, or any combination thereof.

17. A linear motion assembly comprising:
   a component having a longitudinal axis and adapted to translate along the longitudinal axis; and
   a bearing comprising a spiral body including a substrate and a low friction material, wherein the bearing is selectively lockable, and wherein in a locked condition the component is prevented from longitudinal translation in at least one longitudinal direction.

18. The linear motion assembly of claim 17, wherein in the locked condition the bearing prevents longitudinal translation of the component in at least one longitudinal direction when a force is applied to the component parallel to the longitudinal axis, and wherein the force is at least 450N.

19. The linear motion assembly of claim 17, wherein in a unlocked condition the bearing permits longitudinal translation of the component when a force is applied to the component parallel to the longitudinal axis, and wherein the force is no greater than 70N.

20. The linear motion assembly of claim 17, wherein a force required to unlock the bearing is no greater than 40N.

* * * * *

UNITED STATES PATENT AND TRADEMARK OFFICE
CERTIFICATE OF CORRECTION

PATENT NO. : 9,885,388 B2
APPLICATION NO. : 15/272805
DATED : February 6, 2018
INVENTOR(S) : James K. Burgess Page 1 of 1

It is certified that error appears in the above-identified patent and that said Letters Patent is hereby corrected as shown below:

In the Claims

Column 14, Line 13 Claim 4, please add "of" after "assembly" and before "claim 3".

Column 14, Line 62 Claim 14, please delete "D" after "is no greater than 0.995" and insert therefor --$D_U$--.

Signed and Sealed this
Third Day of July, 2018

Andrei Iancu
*Director of the United States Patent and Trademark Office*